United States Patent [19]
Kojima

[11] Patent Number: 4,892,569
[45] Date of Patent: Jan. 9, 1990

[54] COMPRESSED AIR PRESSURE SUPPLY SYSTEM

[75] Inventor: Katsumi Kojima, Yokosuka, Japan

[73] Assignee: Nippon Air Brake Co., Ltd., Kobe, Japan

[21] Appl. No.: 157,726

[22] Filed: Feb. 22, 1988

[30] Foreign Application Priority Data

Feb. 23, 1987 [JP] Japan .................................. 62-024282
Nov. 26, 1987 [JP] Japan .................................. 62-180287

[51] Int. Cl.$^4$ .............................................. B01D 53/04
[52] U.S. Cl. ........................................ 55/163; 55/218; 55/316; 55/387
[58] Field of Search ............... 55/31, 33, 74, 161–163, 55/179, 218, 316, 387

[56] References Cited

U.S. PATENT DOCUMENTS

| | | | |
|---|---|---|---|
| 2,955,673 | 10/1960 | Kennedy et al. | 55/163 |
| 3,080,693 | 3/1963 | Glass et al. | 55/163 |
| 3,395,511 | 8/1968 | Akerman | 55/179 X |
| 3,399,510 | 9/1968 | Kauer, Jr. et al. | 55/163 X |
| 3,486,303 | 12/1969 | Glass et al. | 55/162 |
| 3,714,763 | 2/1973 | Suzuki | 55/163 |
| 3,937,622 | 2/1976 | Hewitt et al. | 55/163 |
| 4,052,178 | 10/1977 | Frantz | 55/218 X |
| 4,231,768 | 11/1980 | Seibert et al. | 55/179 |
| 4,331,457 | 5/1982 | Mörner | 55/163 |
| 4,361,425 | 11/1983 | Hata | 55/163 |
| 4,519,819 | 5/1985 | Frantz | 55/162 |
| 4,544,385 | 10/1985 | Tanaka | 55/218 X |
| 4,549,888 | 10/1985 | Fannin | 55/163 |
| 4,655,801 | 4/1987 | Kojima et al. | 55/316 |
| 4,673,419 | 6/1987 | Kojima et al. | 55/218 X |
| 4,685,941 | 8/1987 | Sato | 55/163 |
| 4,713,094 | 12/1987 | Yanagawa | 55/316 X |
| 4,714,483 | 12/1987 | Koening et al. | 55/163 |
| 4,721,515 | 1/1988 | Hata et al. | 55/163 |

FOREIGN PATENT DOCUMENTS

| | | | |
|---|---|---|---|
| 3304722 | 7/1984 | Fed. Rep. of Germany | 55/161 |
| 3504884 | 7/1986 | Fed. Rep. of Germany | 55/162 |
| 132475 | 10/1979 | Japan | 55/161 |
| 136575 | 10/1979 | Japan | 55/179 |
| 25527 | 2/1985 | Japan | 55/163 |
| 64616 | 4/1985 | Japan | 55/163 |
| 94116 | 5/1985 | Japan | 55/163 |
| 149321 | 7/1987 | Japan | 55/163 |

*Primary Examiner*—Robert Spitzer
*Attorney, Agent, or Firm*—Wenderoth, Lind & Ponack

[57] ABSTRACT

A compressed air pressure supply system includes an air compressor device, an air dryer device having a recoverable desiccant for removing moisture contained in the compressed air delivered from the air compressor device, an air reservoir for storing the dried compressed air from the dryer device, a regenerating valve which is mounted on the air compressor device on the side of the dryer device and opens the air compressor device to the atmosphere under the control of external commands, a governor device which causes a command to be transmitted to the regenerating valve when air pressure prevailing inside the air reservoir has attained a maximum value and which cancels this command when the air pressure in the reservoir has reached a minimum value, an oil separator mounted between the air compressor device and the dryer device for removing residue contained in the compressed air delivered from the air compressor device, a non-return valve for preventing the flow of fluid from the dryer device toward the drain device, and a drain valve mounted on the air compressor device on the side of the draining device and connecting the interior of the draining device to the atmosphere under the control of commands from the governor device.

18 Claims, 5 Drawing Sheets

COMPRESSED AIR PRESSURE SUPPLY SYSTEM

BACKGROUND OF THE INVENTION

1. Field of the Invention

This invention relates to a compressed air pressure supply system used in compressed air systems, such as an air brake system for a vehicle.

2. Prior Art

A conventional compressed air pressure supply system generally comprises, as disclosed in U.S. Pat. No. 4,544,385, a dryer device for drying the compressed air delivered from an air compressor, the dryer device having a recoverable desiccant therein. This system also includes a governor device regulating the pressure inside the air reservoir in which the dried compressed air having passed through said dryer device is stored. The system further comprises a purge reservoir for storing some of the dried compressed air from said dryer device and, a regenerating valve controlled by said governor. The purpose of the regenerating valve is to shut and open, with respect to the atmosphere, the interior of said dryer device so that, when this valve is open, the dried compressed air in said purge tank returns to the dryer device while the water particles having adhered to the desiccant are discharged into the atmosphere to regenerate said desiccant. At the same time, the residue including residual oil particles on the bottom of the vessel is drained to the exterior.

Thus, the conventional system is designed so that the compressed air delivered from the air compressor device is directly introduced to the dryer device. Moreover, the regenerable desiccant will not be fully recoverable even when recovered in the aforementioned matter, when acting highly hygroscopically it attracts oil particles, so that the drying power thereof becomes reduced. Contamination of the desiccant by oil particles occurs to a very serious extent, in particular, when the unloader of the air compressor device is switched over to the loading condition and the oil particles having accumulated in the air compressor device are suddenly supplied. Such contamination due to said residue also arises when residues have formed in large quantities.

A conceivable means of preventing such contamination of the desiccant by oils and residues is to mount an oil separator upstream of the dryer device. However, even with the installation of an oil separator such desiccant contamination will not be avoidable due to a deterioration in the performance of said oil separator as a result of prolonged use. It is self-evident that the problem would be resolved if the desiccant were replaced at regular short intervals, but this would be inconvenient and would give rise to a need to continue the drying operation at a reduced drying efficiency without regular desiccant replacement if the desiccant were used in areas in which the desiccant is not easy to obtain.

SUMMARY OF THE INVENTION

It is therefore an object of this invention to provide a compressed air pressure supply system capable of ensuring, over a prolonged period of time, the prevention of oil contamination of the desiccant placed in the dryer device.

According to the present invention, there is provided a system for removing, through the drain device, oil and residue contained in the compressed air while the compressed air is being dried, and for cleaning the drain device by discharging the internal residues from the drain valve while the desiccant is being regenerated, the system comprising an air compressor device, an air dryer device having recoverable desiccant for the removal of moisture contained in the compressed air delivered from said air compressor device, an air reservoir for storing the dried compressed air from said dryer device, a regenerating valve mounted laterally on said air compressor device on the side of said dryer device and which connects, under the control of external commands, the side of said air compressor device adjacent to said desiccant to the atmosphere, a governor device which causes a command to be transmitted to said regenerating valve in the event that the air pressure prevailing inside said air reservoir has attained a maximum value and which cancels this command when the air pressure in the reservoir has reached a minimum value, a draining device mounted between said air compressor device and said dryer device and designed for the removal of residues contained in the compressed air delivered from said air compressor device, a non-return valve for impeding the flow of fluid from said dryer device toward said drain device, and a drain valve mounted laterally on said air compressor device on the side of said draining device and connecting the interior of said draining device to the atmosphere under the control of commands from said governor device.

DETAILED DESCRIPTION OF THE PREFERRED EMBODIMENTS OF THE INVENTION

The following is a detailed explanation of the compressed air pressure supply system according to the present invention made with reference to the drawings.

Figure 1:
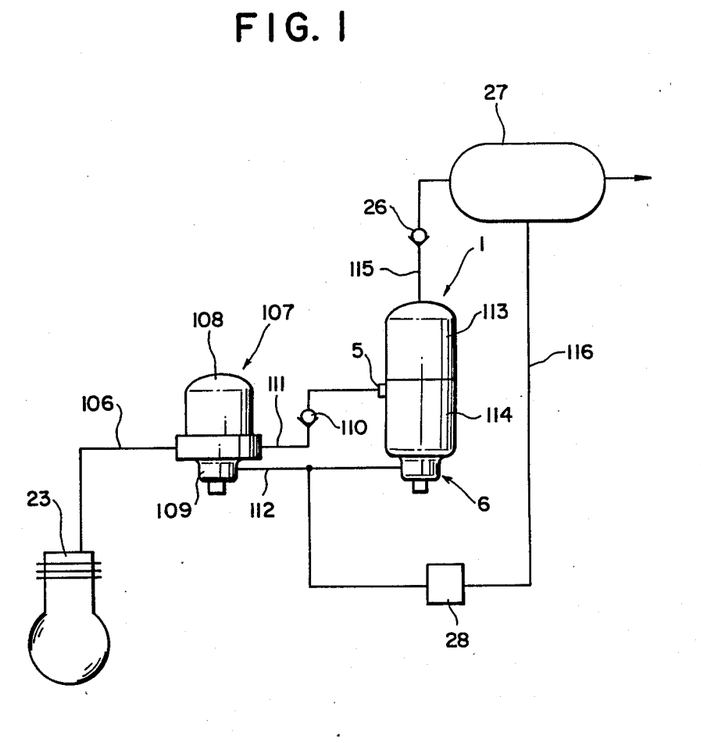
FIG. 1 is a schematic diagram showing an embodiment of the present invention.

The general line circuit arrangement will be explained by referring to FIG. 1. In FIG. 1, the compressed air supply port of a compressor (23) serving as an air compressor device is connected to an oil separator (107) serving as a drain device through a passage (106). Said oil separator (107) is comprised of a purge reservoir element (108), including an oil separating element, and a drain element (109), the purge reservoir element (108) connected through a non-return valve (110) to an air dryer device (1). Said air dryer device (1) is comprised of a purge reservoir element (113), a dryer element (114), and a regenerating valve element (6), said passage (111) connected to the dryer element (114). The regenerating valve element (6) is connected through a passage (112) to the said drain valve element (109) of said oil separator (107). The non-return valve (110) normally permits flow in a direction from the oil separator (107) toward the air dryer device (1).

The purge reservoir element (113) of the air dryer device (1) is connected, through a passage (115) and a non-return valve (26) to an air reservoir (27) serving as an air storage tank. Connected through a passage (116) to the air reservoir (27) is a governor device (28) which detects the air pressure of the air reservoir (27) in such a manner that when said air pressure exceeds a predetermined minimum pressure level and rises to a predetermined maximum pressure value, a given control pressure is supplied to the drain valve element (109) of the oil separator (107), and the regenerating valve element (106). If, conversely, the air pressure of the air reservoir (27) falls to or below the predetermined minimum pressure level, the system is designed so that the governor device (28) detects this pressure drop to exhaust the control pressure. As indicated by the arrow, said air reservoir (27) is connected to various operating devices requiring compressed air.

Figure 2:
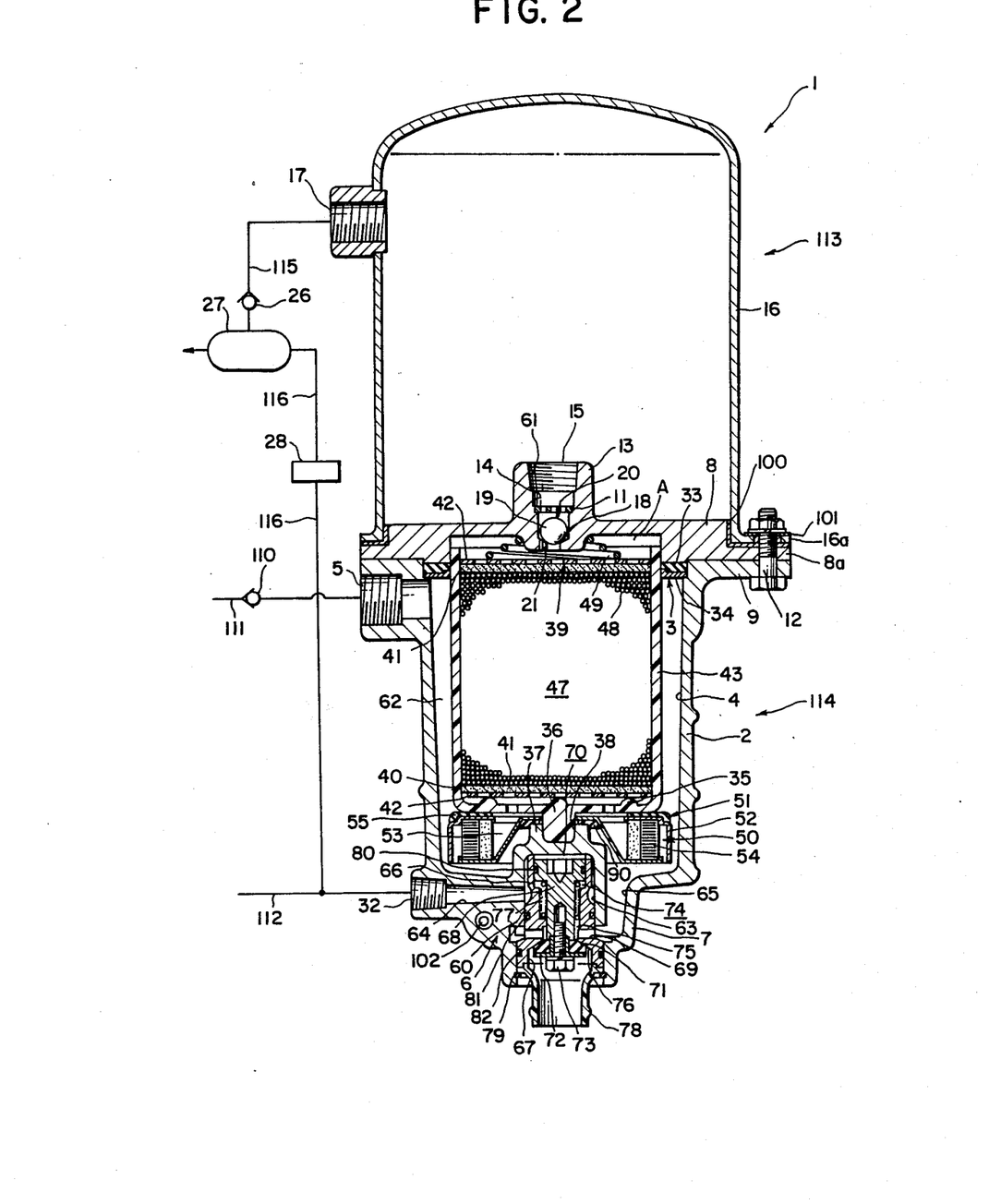
FIG. 2 is a longitudinal sectional view of the dryer device installed in the circuit according to FIG. 1.

A detailed explanation of the various devices features in FIG. 1 follows with the air dryer device (1) being explained first by referring to FIG. 2.

The unit housing (2) of the dryer element (114) of the air dryer device shown schematically as (1) in FIG. 2 has an internal aperture (4) extending in an upward direction. Mounted on the upper side of said unit housing (2) is a compressed air inlet port (5) communicating with said internal aperture (4). The bottom of said unit housing (2) is integral with the valve body (7) of the regenerating valve element (6). However, mounted onto the upper part (9) of said unit housing (2) is a sealing cover (8) for sealing the internal aperture (4) and that is provided on the unit housing (2) in such a manner that a protruding engagement portion of said sealing cover (8) is in a sealing engagement with the upper part (9) of the unit housing (2). The sealing cover (8) and the unit frame (2) are mutually secured to form an integral structure by means of a plurality of bolts (12).

The center of the top surface of the sealing cover (8) forms a boss section (13). Internally provided in this boss section (13) is a line connector aperture (15) open to a passage (14) communicating with the interior of the unit housing (2). A valve seat (18) is provided in said passage (14) and a spherical valve part (19) is seated on this valve seat (18) so that said valve seat (18) and spherical valve part (19) constitute a non-return valve (20) permitting air flow only in a direction from the interior of unit housing (2) toward the line connector aperture (15). Furthermore, said passage (14) is open to a throttle duct (21) normally placing the interior of the unit housing (2) in communication with the connector aperture (15) by bypassing said non-return valve (20). A stopplate (11) having multiple holes is press-fitted into the lower hole provided in the line connector aperture defining line-fastening threads (61) to prevent the spherical valve part (19) from escaping from the passage (14).

Mounted on the top of the sealing cover (8) is a regenerating tank (16) secured thereon through an annular heat-insulating part (100) having an L-shaped cross section by a bolt (12) and serving as the aforesaid purge reservoir element (113). The sealing cover (8) and regenerating tank (16) are mutually fastened by means of said bolt (12) and multiple protruding engagement members (8a) (16a) thereof that are disposed at equiangular intervals, with small annular heat-insulating members (101) being provided therebetween. The regenerating tank (16) is thermally insulated by the heat-insulating members (100) (101) which block the thermal conduction path from the sealing cover (8), that is the unit frame (2).

Said heat-insulating members (100) (101) may consist, by way of example, of a ceramic material, oil-drenched hermetic glass wool, or asbestos. Rubber may also be used.

The regenerating tank (16) has an outlet aperture (17) on its upper part and is connected to the air reservoir (27), constituting said main tank, through said passage (115) and non-return valve (26). The function of the governor (28) connected to the main tank (27) is to regulate the air pressure inside the main tank (27) so as to maintain this pressure within a range of 7-8 kg/sq.cm, for example. This governor is connected to the control board of the regenerating valve element (6) through line passage (116). As has been pointed out above, various types of equipment are connected, without being shown, to the main tank. Moreover, the figure shows certain parts such as the main tank (27) in a reduced size.

A plurality of orifices are provided at the bottom of a container (43) extending in the aperture (4) of unit housing (2), and a plurality of projections (35) are provided on the bottom surface on the inner side thereof, a locating projection (36) being provided in the center of the bottom outer surface. Said container (43) is initially positioned with respect to the unit housing (2) by inserting the locating projection (36) in a hole (38) formed inside a boss (37) of housing (2). A pair of top and bottom partitioning walls (39) (40) inside the container are slidably positioned with respection to the interior side walls of the container (43), forming a chamber (47) therebetween in which the desiccant (48) is disposed.

The top and bottom partitioning walls (39) (40) consist of sponge or filter material, a partitioning plate (42) housing a multiplicity of apertures, and air-permeable paper inserted therebetween. A filter cloth (41) is placed in an overlapping arrangement on the partitioning plate (42), with the paper inserted therebetween. The respective edge sections are attached with adhesive.

The lower partitioning wall (40) formed in the aforementioned manner is located on the bottom projections (35) of the container (43), the filter cloth (41) being turned upwardly so as to extend into the container (43) when the air dryer device (1) is assembled. A predetermined quantity of the desiccant (48) is subsequently charged into the interior of the container (43) whereupon the top partitioning wall (39), consisting of a filter cloth (41), the partitioning plate (42), and the paper, is introduced into the dryer tube (43) in such a manner that the filter cloth (41) faces downward.

After the desiccant (48) has been charged in the aforementioned manner, the container (43) is inserted into the interior of the unit housing (2) and temporarily located with respect to the unit housing by inserting the locating projection (36) into the hole (38) of the boss (37). In the present embodiment of the invention, however, the container (43) is positioned in all actuality by a guide member (3). Said guide member (3) consists of a support ring (34) and a sealing ring (33) maintained thereon and is held in a sealing and slidable engagement between the outer wall of the container (43) and the inner wall of the unit housing (2). In this arrangement, the container (43) is located inside the unit housing (2). This guide member (3) also ensures that a hermetic seal is maintained between an inlet chamber side communicating with the inlet port (5) and an outlet chamber A communicating with the line connector aperture (15), that is, the outlet port.

After the container (43) has been located with respect to the unit housing (2) in the aforementioned manner, a spring (49) is introduced between the upper partitioning wall (39) and the sealing cover (8), the sealing cover (8) being secured on the unit housing (2) by a bolt (12) so that the desiccant (48) inside the chamber (47) and contained within the container (43) is held in compression through the upper partitioning wall (39).

A filter (50) positioned at the bottom of the container (43) is installed inside the unit housing (2) downstream of the container (43), and this filter (50) will be explained more fully below.

The filter (50) consists of an upper annular support member (52), a conically shaped lower support member (53), and an annular oil filter (54) supported by said upper and lower support members. The filter (50) is disposed inside the unit housing (2) so that the aperture provided in the center of the conically shaped lower support member (53) is aligned with the hole (38) provided in the boss (37), the container (43) being located thereon under the compression force of the spring (43) and sealing members (51) (90) being disposed between container (43) and filter (50).

Sealing member (51) consists of rubber and roughly has an annular shape, its outer wall and a pair of ring-shaped projections being integral with each other. The bottom surface of the sealing member (51) is shaped so that it is complimentary to the shape of the outer surface of the upper edge of the upper support member (52) of the filter (50). When said sealing member (51) is positioned on the upper support member (52), the edge section (55) of sealing member (51) engages the edge section of the support member (52), thereby ensuring that the sealing member (51) is located with respect to the upper support member (52), and thus with respect to the filter (50). After spring (49) is inserted and the sealing cover (8) is fastened on the unit housing (2) by means of bolt (12), the ring-shaped projections of sealing member (51) interposed between the container (43) and the filter (50) are pressed down under the compressive force exerted by the spring (49) and the deadweight of the container (43) filled with the desiccant (48), thereby assuring a proper hermetic seal of the sealing member (51). A passage (62) formed between the unit housing (2) and the container (43) communicates, on one side, with the inlet port (5) and, on the other side, with the passage (14) through the oil filter (54), chamber (47), the chamber A accommodating spring (49), non-return valve (20), and the throttle passage (21), as well as with the regenerating tank (16) through the line connector aperture (15).

In the present embodiment of the invention, the regenerating tank (16) is directly connected in the air dryer device (1) to dryer element (114) by means of bolt (12). If, however, the regenerating tank is located elsewhere, a line may be connected to the connector aperture (15), thereby establishing the connection between the regenerating tank (16) and dryer element (114). The air dryer device (1) in the present embodiment of the invention is designed so that it can accommodate either of these alternatives.

The regenerating valve element (6) has a hole (63) inside the valve body (7). Said hole (63) communicates through a passage (64) with a control port (32) on one side, and through a passage (65) with the interior of the unit housing (2) on the other side. A plug (60) inserted into the hole (63) defines, in its interior, a hole (66) and a hole (67). A control piston (68) is slidably disposed in said hole (66). The top part of hole (67) forms an exhaust valve seat (76); the bottom part of said hole (67) is open to the atmosphere. A chamber (70) defined inside the hole (63) the communicates through passage (64) with the control port (32). Secured by means of a bolt (73) on the bottom end of the control port (68) through a facing plate (72) is a valve member (71) consisting of elastic material. Said valve member (71) coacts with the exhaust valve seat (76) to control the passage between the interior of the unit housing (2) and the atmosphere. A chamber (74) defined inside the hole (66) by the control piston (68) communicates through notch passage (75) and passage (69) with the passage (65). The spring (77) mounted inside said chamber (74) normally maintains the control piston in the upper position. The plug (60) may be removed and is maintained in position by the arrester wheel (79) retaining a cover member (78). Sealing rings (80) and (81) provide a seal between the plug (60) and housing (2) while sealing ring (82) provides a seal between plug (60) and piston (68).

In the valve body (7), an electrothermal heater (102) is located in the vicinity of the regenerating valve element (6). When power is supplied to this heater (102), the regenerating valve element (6) will be heated, and to achieve a constant heating temperature, a thermostat, not shown in the drawing, is provided in a suitable location in the valve body (7).

Figure 3:
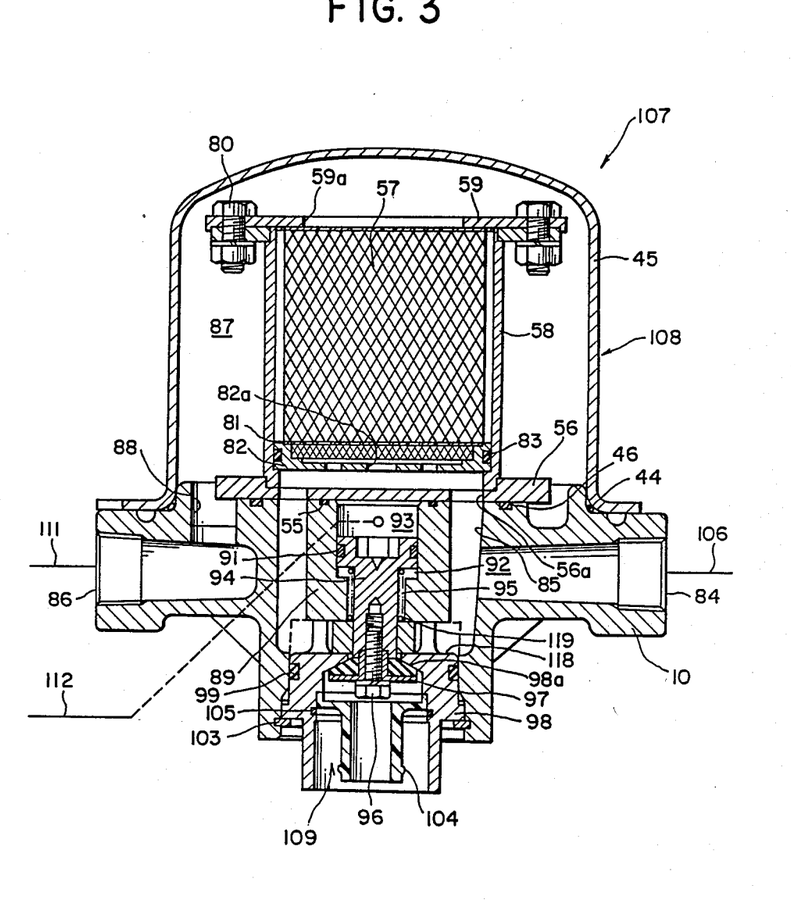
FIG. 3 is a longitudinal sectional view of the drain device installed in the circuit according to FIG. 1.

The following is a detailed description of the oil separator (107) with reference to FIG. 3.

Mounted on the unit housing (10) in FIG. 3 is a purge reservoir tank (45), with a sealing ring (44) interposed therebetween. In said purge reservoir tank (45) a sealing ring (46) and an inner sealing ring (55) are located inside the unit housing (10) and a filter support plate (56) having an annular opening (56a) is provided, a filter (57), composed of metal wire or fabric woven in a net-shaped pattern, being positioned in the interior of a support tube (58). Said filter (57) is held inside the support tube (58) by means of a mounting ring (59) having an opening (59a) disposed at its top end and a bolt (80). The filter (57) has a filter element (81) inserted at its bottom end, the latter being located by a filter support member (82). Said filter support member (82) has a multiplicity of apertures (82a) which communicate with compressor connection aperture (84) provided on the unit housing (10) and through-hole (85). A sealing ring (83) provides a seal between the filter support member (82) and the support tube (58). On the left side of the unit housing (10), there is a dryer connection hole (86). Dryer connection hole (86) communicates through a through-hole (88) with the space (87) inside the reservoir tank (45).

Approximately in the center of the unit housing (10), there is disposed a drain valve element (109) which is located within the tubular-shaped inner wall (89) of the unit housing (10). Mating in a sliding engagement therewith is a drain piston (94) fitted with a seal ring (91), and a pressure chamber 93) is defined thereabove, receiving pressure signals from the aforementioned governor device (28). Moreover, a control port which is not shown in the drawing and which corresponds to a control port (32) provided in the air dryer device (1) of FIG. 2, is provided and communicates with said pressure chamber (93). The drain piston (94) is biased to the upper position under the action of a spring (95). A ring-shaped rubber valve body (97), secured by means of a bolt (96) onto the lower end of drain piston (94), is in close-fit contact the top end (98a) of a valve seat (98), the purpose of this arrangement being to shut off flow toward the outside and the inside of the drain device (107). The valve seat (98) is provided with a seal ring (99) and mates with the unit housing (10). It can be removed from its engagement and is retained by means of a throw-out arrester ring (103). Furthermore, a drain connector member (104) adopted to secure the drain tube within the internal aperture is secured on the valve seat (98) by means of a throw-out arrester (105). Moreover, the space (92) in which the spring (95) is compressed communicates with the compressor connection aperture (84) through a through-hole (118) and a gap (119).

In the preferred embodiment of the invention, the regenerating valve element (6), the drain element (109) and the air dryer device (1) are designed as described above. However, the valve-opening pressure of the drain valve element (109) is designed so that it is smaller than the valve-opening pressure of the regenerating valve element (6). That is to say, either the spring force of the spring (77) urging the piston (68) to the upper position in the regenerating valve element (6) of the air dryer device (1) is designed so that it is greater than the spring force of the spring (95) urging the piston (94) of the drain valve element (109) of the drain device (107) or the pressurized surface area of the piston (68) of regenerating valve element (6) receiving pressure in the control pressure chamber (70) is smaller than the pressurized surface area, receiving pressure in the control pressure chamber (93), of the piston (94) of the drain element (109) of the oil separator (107). Furthermore, to ensure that either the pressurized surface areas or the spring forces meet the conditions set forth above, the valve opening force of the drain valve (109) may also be made smaller than the valve opening force of the regenerating valve element (6). Alternatively, if either one of the conditions discussed above is met, the valve opening force of the drain valve element (109) may be smaller than the valve opening pressure of the regenerating valve element (6). Alternatively, some other configuration may be adopted so as to obtain differences in terms of a higher or smaller valve opening pressures.

The operation of the pneumatic pressure supply device according to the present embodiment of this invention is explained below.

When the compressor (23) is turned on, compressed air is supplied from the compressed air supply port of the compressor (23) through a passage (106) to the drain device (107). In the oil separator (107) compressed air is supplied to the connector aperture (84) and passes through the through-hole (85), the filter support member (82), and the filter (57) to the space (87) inside the reservoir tank (45). Since the compressed air passes through the filter (57), all oil and residues contained in the compressed air are thereby eliminated, so that clean compressed air flows through the connector aperture (86) of the dryer device, opens the non-return valve (110) and reaches the interior of the air dryer device (1).

In FIG. 2, compressed air is supplied from the oil separator (107) to the inlet port (5) of the dryer device (1). The compressed air then passes through a passage (62) and oil filter (54) and enters a chamber (47) in which it is dried by means of the desiccant (48). After drying, the dried compressed air opens the non-return valve (20), flows through the passage (14) and the line connector aperture (15) and is stored in the regenerating tank (16). The dried compressed air then flows from the outlet port (17) of the regenerating tank through a passage (115) and a non-return valve (26) to be stored in the main tank (27). The dried compressed air stored in the main tank (27) is supplied, as indicated by the arrow, to the various units in the air brake system, for example, although these are not shown in the figure.

When the air pressure inside the main tank (27) has reached a predetermined value, for example, 8 Kg/sq.cm. the governor (28) generates a control pressure acting as an unload pneumatic signal, and this pressure is supplied to the drain valve element (109) of the oil separator (107) and the regenerating valve element (6) of the air dryer device (1). That is to say, the pressure is supplied to the control port (not shown in the figure) of the drain valve element (109), and the control port (32) of the regenerating valve element (6). The signal pressure supplied from the governor (28) to the control parts is conducted to the respective chambers (93) (70) and the air pressure will operate the corresponding control pistons (94) (68). However, while the piston (94) of the drain valve element (109) of the oil separator (107) is displaced in a downward direction, as shown in FIG. 3, in such a manner as to compress the spring (95), the other piston (68) in the regenerating valve element (6) of the air dryer device (1) does not move. As the control piston (94) of the drain valve element (109) moves downward, the valve body (97) is dislocated from the exhaust valve seat (98a), and, as a result, the interior of the reservoir tank (45) is connected to the atmosphere through a filter (57) and a passage (85). Consequently, the compressed air in the reservoir tank (45) is exhausted to the outside through said filter (57) and passage (85), thereby causing the drain residues adhering to the surface of the filter (57) to be discharged into the atmosphere as drainage residue through the passage (85) and thus, the filter (57) is regenerated.

The compressed air furnished by the compressor (23) and stored in purge tank (45) causes the piston (94) of the drain valve element (109) in the drain device (107) to move in the downward direction to open the valve so that the compressed air from the compressor (23) is discharged into the atmosphere. That is to say, a status change occurs from the load to the unload condition, as the compressed air is no longer supplied to the side of the air dryer device (1). Due to the non-return valve (110), however, no back-flow of compressed air from the air dryer device (1) to the discharge side of the oil separator (107) will and can occur.

When the valve of the drain valve element (109) of the oil separator (107) opens, the compressed air contained in the purge tank (45) will virtually instantaneously be discharged into the atmosphere through the oil filter (57), and the oil portions retained in said oil filter (57) will be removed. The opening of the valve of said drain valve element (109) causes the compressor (23) to be connected to the atmosphere so that the unload condition arises. In the meantime, however, the control pressure of the governor device (28) will rise and, as a result, the valve of the regenerating valve element (6) in the air dryer device (1) will also open.

That is to say that, the pressure of the air in the reservoir tank (27) will be lower than 8 kg f/sq.cm. and if, by way of example, this pressure is 6.0 kg f/sq.cm (when the pressure at the drain valve (109) is even lower, reaching, by way of example, 5.0 kg f/sq.cm), the piston of the regenerating valve element (6) will move downward so that the regenerating valve will open, causing the compressed air in the regenerating tank (16) to return through the drying tube so as to be discharged to the outside. In this condition, the moisture (water particles) adhering to the desiccant in said drying tube will be entrained and discharged outside, thereby removing the moisture (water particles) from said desiccant (47). When, as a result, the pressure in the air reservoir tank (27) drops to a pre-determined minimum level, say, 7 kg f/sq.cm, the control pressure of the governor (28) will become nil.

As stated earlier, in the present embodiment of the invention, an oil separator (107) is mounted on the compressor (23) side of the air dryer device and a drain element (109) thereof is designed so that its valve is opened by the control pressure from the governor device (28) prior to the regenerating valve element (6), thereby causing the compressor (23) to assume the unload condition. As the compressed air in the oil separator (107) is thus discharged to the outside, the oil particles adhering to the oil filter will be discharged to the outside and consequently removed from the filter (57) so that said filter (57) is cleaned, thereby serving as an effective means of preventing the entrainment of oil particles in compressed air supplied from the compressor (23) to the dryer device (1). Furthermore, an oil filter (54) is also mounted in the air dryer device (1) in such a manner that the compressed air stripped of the oil particles upstream therefrom in the oil separator (107) will flow through this oil filter (54) for additional cleaning whereupon it is sent to the desiccant (47). By this means, it is thus possible to ensure the effective prevention of oil contamination of the desiccant (47).

Thus, this system differs from conventional systems in which no oil separator is installed between the compressor and the air dryer device. Consequently, the compressed air from the compressor, in particular, the compressed air immediately after the start of operation will contain significant amounts of oil particles so that this compressed air is sent directly to the oil filter element of the air dryer device whereby, as a result, the oil filter element, if still new, will ensure the effective removal of these oil particles from the compressed air. However, as the oil-contaminated compressed air passes through the filter element, its filtering action will deteriorate and oil particles will lodge upon the desiccant, thereby giving rise to the danger of oil particle entrainment in the air reservoir. Yet, in the present embodiment of the invention, a drain device (107) is installed between the compressor (23) and the air dryer (1) so that the oil particles contained in the compressed air from the compressor (23) are first removed therein and the compressed air thus stripped of the oil particles is subsequently sent to the air dryer device (1) whereupon, in accordance with the preferred embodiment of the invention, the oil particles are again removed by an oil filter, thereby ensuring the adequate removal of the oil particles before the compressed air is passed through the desiccant.

However, a long-term use of the filter element in the oil separator (107), will result in an increasing amount of oil particles being deposited in the oil separator so that if, as in conventional systems, the valve of the regenerating valve element of the air dryer device is temporarily opened earlier, under the action of the control pressure of the governor device, the compressed air will be discharged to the outside and the compressor will change to the unload condition. Furthermore, the moisture (water particles) retained by the desiccant will also be discharged to the outside as a result of the compressed air flowing back from the purge tank. In the oil separator, however, the drain element will, at that time, not yet be open so that the compressed air from the purge tank (whose pressure will drop as the regenerating valve opens) will not be returned to the outside and the drainage residue in the oil filter will therefore not be removed, thus remaining contaminated with oil particles.

Even if the drain valve element is opened thereafter, the situation will remain the same. Even if the regenerating valve element has shut and the compressor has again returned to the load condition to restart the supply of compressed air through the oil separator to the air dryer device, the oil filter of the oil separator will present a reduced oil removing efficiency so that compressed air having a large amount of oil particles will be supplied to the air dryer device and thus result in oil contamination throughout the system including the desiccant even though an oil filter has been installed.

However, in the present embodiment of the invention, an oil separator (107) is installed between the compressor (23) and the air dryer device (1) so that oil particles are constantly being removed from the compressed air generated by the compressor (23) and, furthermore, as the pressure of the compressed air in the air reservoir (27) reaches a value corresponding to the upper level of the predetermined detection pressure set on the governor device (28), this control pressure will be supplied to the drain valve element (109) and the regenerating valve element (6), and, furthermore, the valve of the drain valve element (109) will open earlier while the compressor (23) changes to the unload condition, the compressed air from the air purge tank (45) of the oil separator (107) being discharged through oil filter element (57) to the outside. During this discharge, the oil particles adhering to the filter element (57) will likewise be discharged to the outside, thereby regenerating the filter. Moreover, a non-return valve (110) is installed between the air dryer device (1) and the oil separator (107) so that a normal direction of flow is toward the air dryer device (1) is maintained so that the compressed air from the air dryer device (1) will not flow back toward the oil separator (107), thereby ensuring that its pressure will drop. By this means, it is assured that the oil separator (107) functions properly at all times, thereby preventing the entrainment of large amounts of oil in the air dryer device (1). This is, consequently, an effective means of preventing the desiccant in the air dryer device (1) from being contaminated by oil particles.

Figure 4:
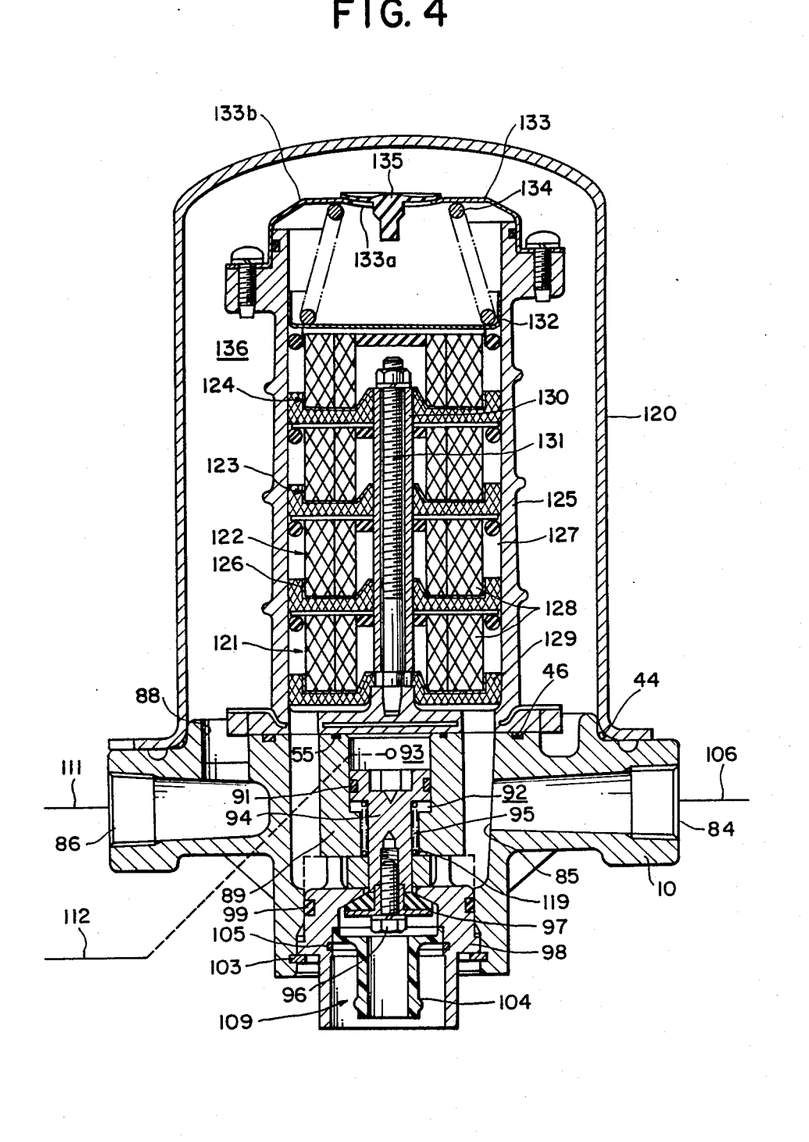
FIG. 4 is a longitudinal sectional view of another embodiment of the drain device installed in the circuit according to FIG. 1.

FIG. 4 shows a second embodiment of the invention in which an oil separator includes a drain device. In the figure, the drain valve element (109) is constructed in the same manner as that shown in the first embodiment of this invention, so that the following explanations will be limited to the oil filter only. That is to say, a reservoir (120) is mounted on the unit housing (10) by means of bolts which are not shown in the drawing. In its interior, an oil filter element, consisting of a plurality of oil filter elements (121) (122) (123) (124) each having the same shape as the filter element (50) in the aforementioned oil dryer device (1), is inserted in a tubular member (125) made of transparent plastic. Since said oil filter elements (121) (122) (123) (124) have an identical construction, the following description will be limited to the lowermost filter element (121) only. This filter element is designed in the same manner as the filter element (50) of the air dryer device (1), with an oil filter (128) clamped between a lower holding member (126) and an upper holding member (127), a felt pad (129)

being intercalated at the bottom of the lower holding member (126). The oil filter elements (121) (122) (123) (124) are rendered integral by a bolt (131) extending within a tube body (130). A spring bearing (132) is provided on the top of the uppermost oil filter element (124), a spring (134) being tension-mounted between the top end thereof and a cap (133) covering the tubular member (125). Said spring is tensioned so as to exert pressure an the oil filter elements (121) (122) (123) (124), thereby securing the filter elements inside the tubular member (125).

An exhaust valve (135) made of flexible material such as rubber, for example, is press fit into the hole provided in the center of said cap (133). This cap (133) has a plurality of small holes (133a) facing the outer rim of valve (135) so that when compressed air flows from the bottom said outer rim is deflected upward to permit the discharge of compressed air through the small holes (133a) into the annular space (136) formed between the tank (120) and the tubular member (125). Furthermore, the cap is also provided with small holes (133b) so that when the drain valve element (109) has opened, the purge air will flow through these small holes (133b), that is to say, that it will be throttled to be discharged to the outside through the oil filter elements (121) (122) (123) (124).

It is clear therefore that the oil separator of FIG. 4 performs the same function as described in the aforementioned embodiment.

Figure 5:
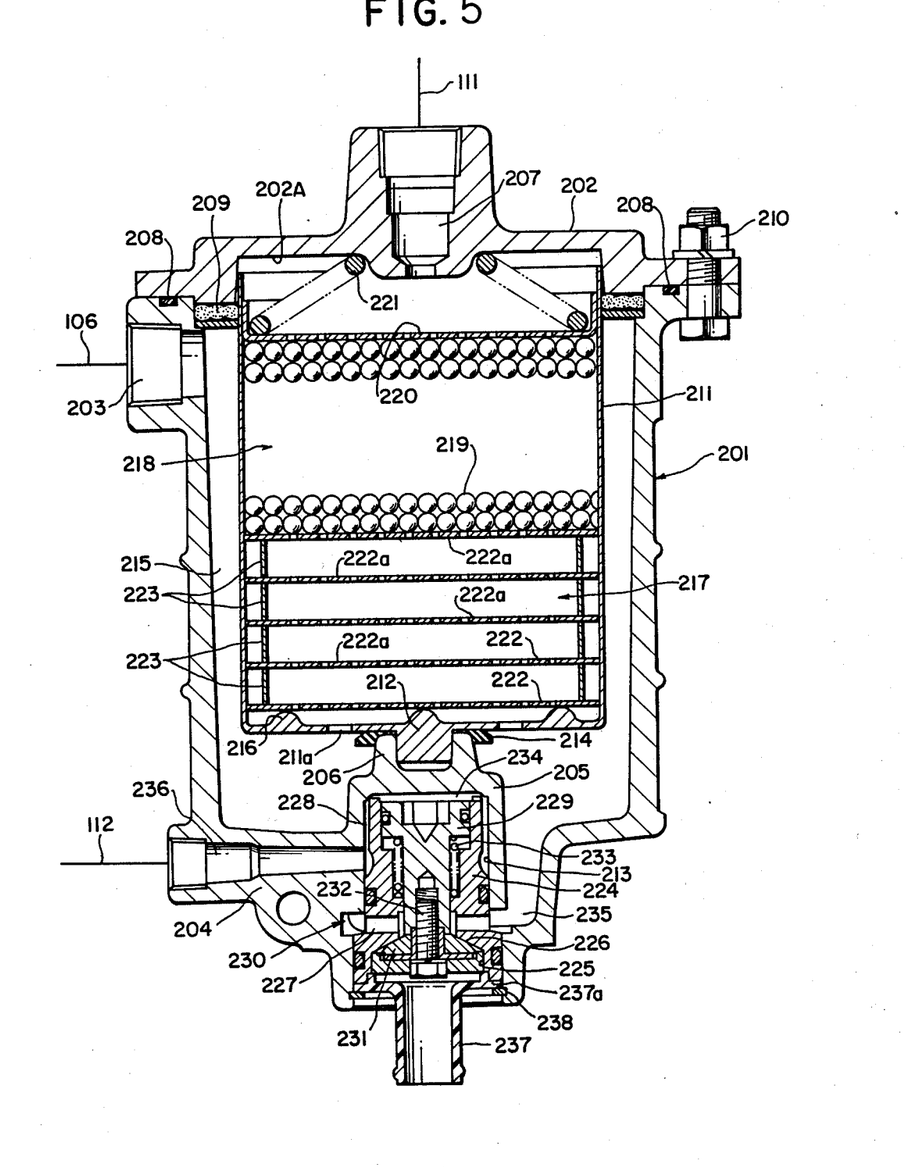
FIG. 5 is a longitudinal sectional view of yet another embodiment of the drain device installed in the circuit according to FIG. 1.

FIG. 5 shows a third embodiment of the oil separator (107) according to the invention. Its housing (201) has the same shape as the unit housing (2) of the drying device (1) presented in FIG. 2. The drain valve element (230) has the same structure as that of the regenerating valve element (6). The housing (201) is covered by a sealing cover (202), and the top part of the side walls are provided with an inlet aperture (203) connected through passage (106) to the air compressor device (23) while the bottom wall (204) acting as the drain valve housing has a projecting part (205) extending internally at the center thereof. Said projecting part (205) has a boss (206) projecting from its upper surface. The interior of the the sealing cover (202) defines a cavity. A central outlet aperture (207) is connected through a passage (111) and a non-return valve (110) to the compressed air inlet (5) of the drying device (1). The sealing cover (202) is in mating engagement with the housing (201) through the intermediary of a sealing ring (208) and a sealing device (209), and is fastened to the housing by means of a bolt and nut (210).

A support tube (211) is arranged in the housing (201) in such a manner that the projection (212) extends from the outer surface at the bottom of the tube into boss (206), the tube in engagement through spacer (214) with the boss (206). The top part of the tube engages the sealing cover (202) within recess (214). A flow passage (215) is defined between the internal lateral and the lower internal surfaces of housing (201) and tube (211). On the bottom of said support tube (211) there is a plurality of holes (211a), and a plurality of projections (216) acting as a seat. A first trap section (217) is disposed on the projections (216), the space above the trap (217) being filled with a granular solid material (219) forming a second trap (218). A push-down force is applied to the granular solid packed layer by means of a spring (221) through the intermediary of a porous push-down plate (220). Said porous push-down plate (220) engages the support tube (211), the aforesaid spring (221) being tension-mounted between said porous push-down plate (220) and the sealing cover (202). The first trap section (217) is a multi-tier assembly made up of several plates (222) having a plurality of flow-through holes (222a) by means of a frame member (223), the edge of each plate (222) being contiguous with the inner surface of the support tube (211). The second trap section (218) has ceramic balls, for example, as the granular solid material (219).

The bottom wall (204) acting as the drain valve housing has an aperture extending through its bottom surface open to a hole (213) extending within the projecting part (205). A plug (224) is in engagement with the projecting part (205) within said hole. Said plug (224) has a recess (225), a valve seat (226) disposed at the center of the recess (225), and a passage (227) extending in a radial direction and one end of which faces said valve seat (226). A passage (228) is between the plug (224) on the upper part of the aperture (213). A control piston (229) has with a valve member (231) mounted on the bottom end thereof by means of a bolt (232). It is biased to an upward position by means of a spring (233). A control pressure chamber is defined above the piston (229) within the hole (213). The bottom wall (204) has an upright hole (235) communicating with a passage (227) and a control port (236) communicating with passage (112). A discharge tube (237) has a flange (237a) adjoining the lower end of the plug (224). An arrester ring (238) retains said discharge tube but allows removal of the same.

The compressed air delivered by the air compressor device (23) is supplied to the trap inlet port (203) and flows from the inlet port (203) through flow passage (215). It then passes through the holes (211a) provided in the bottom of said support tube rising through the first trap section (217) by passing through the flow holes (222a) provided in the plates (222) to enter the second trap section (218). On its ascent through the first trap section (217), the compressed air impinges upon, or collides with, the individual plates (222) from the bottom of the top stage, whereby a part of the oil and water contained therein are removed, the remaining oil and water falling to the bottom of the support tube (211) to be discharged through the hole (211a) onto the bottom of the housing (201). After the compressed air passing through the first trap section (217) has traveled upward through the second trap section (218), it is discharged from the outlet (207). This trap section (218) comprises granular solid material (219) so that the remaining oil which has not been removed in the first trap section will be deposited on the surface of said solid material (219). As a result, the compressed air flowing from the inlet port (203) into the housing (201) will be largely stripped of the oil and water contained in it during its passage, whereupon it is discharged from the outlet orifice (207). This contributes to a major reduction in the desiccant requirement for the air dryer device (1) and the consumption of oil filters installed upstream of the desiccant. The dried compressed air passing from the air drying device (1) is supplied to the air storage tank (27) after the purge tank is full.

For this purpose, the spring force of the spring (233) biasing the control piston (229) of the drain valve element (230) is either designed to be smaller than the spring force of the spring (77) biasing the control piston (68) of the drain valve element (6) or, alternatively, the pressurized surface area receiving pressure from the control pressure chamber (234) of the control piston (229) is designed to be bigger than the pressurized surface area receiving pressure from the control pressure chamber (70) of the control piston (68), so that, if the regenerating valve is installed in the preliminary stage of the air dryer device (1), contamination by oil particles of the dessicant in the air dryer device (1) will take place at a very slow rate. However, the oil separator according to this embodiment of the invention is easy to regenerate, as has already been pointed out, so that it is possible to obtain a compressed air that is very dry without replacing the desiccant in the air dryer device (1) for a long time. Furthermore, the granular solid material (219) is easily available in practically all regions of the world so that the oil separator according to this embodiment of the invention is of the greatest practical advantage when used in pneumatic pressure supply systems operated in such parts of the world in which the aforementioned desiccant is difficult to obtain.

As pointed out above, with the pneumatic pressure supply system according to this invention, it is possible to prevent the contamination the air dryer device with oil and to prevent the fouling of the desiccant for a long period of operation, thereby guaranteeing a long-term maintenance-free period of the original system without deterioration.

While the foregoing description of the invention has been made on the basis of particular embodiments thereof, it is evident that these examples do not limit the scope of the invention which is not to be restricted thereby and which is capable of modification to obtain a variety of embodiments based on the technical concept of the invention.

Thus, for example, an oil filter (50) has been installed also in the air dryer device (1), but this may be dispensed with.

Furthermore, in the aforementioned embodiments of the invention, the temporal antecedence or posteriority in the timing of the opening of the drain valve of the drain device to that of the regenerating valve of the air dryer device is achieved by means of a higher and lower pressure from the governor device. However, it may also be possible to achieve an adequate timing differential by installing a throttling device between the governor device (28) and the regenerating valve (6). With reference to FIG. 1, said throttling device may also be installed in the passage between the governor device (28) and the passage (112). In said passage (112), it may, alternatively, also be installed on the side of the regenerating valve element (6).

Furthermore, an on-off valve may be mounted on the side of the regenerating valve element (6) in the passage (112) whereby said on-off valve is normally closed to open the drain valve (109) of the oil separator (107) independently of the control pressure from the governor device (28), the open condition of the drain valve (109) of the oil separator (107) being detected by some suitable means, for example, by means of a limit switch detecting the movement of the control piston toward the bottom, and the detection signal being fed to the control section of said on-off valve causing it to open so that the control pressure from the governor device (28) is fed to the regenerating valve element to open the valve of this valve element.

What is claimed is:

1. An air compressor system for supplying compressed air, said system comprising:
air compressor means for compressing air;
an air dryer means operatively connected to and disposed downstream of said air compressor means in the system so as to receive compressed air from said air compressor means,
said air dryer means including desiccant for removing moisture from the received compressed air;
an air reservoir operatively connected to and disposed downstream of said air dryer means in the system so as to receive dried compressed air from said air dryer means and for storing the same;
a regenerating valve connected to said air dryer means and communicable therewith and with the atmosphere exterior of the system, said regenerating valve movable between a first position at which the interior of said air dryer means is open to the atmosphere through said valve and said desiccant is regenerable and a second position at which said regenerating valve closes the interior of said air dryer means to the atmosphere;
an oil separator means connected to and between said air compressor means and said air dryer means, said oil separator means comprising residue removing means for removing residue in compressed air passing from said air compressor means to said air dryer means,
a drain valve connected to said oil separator means and communicable therewith and with the atmosphere, said drain valve movable between a first position at which the interior of said oil separator means is open to the atmosphere and residue removed from compressed air by said oil separator means is dischargeable through said drain valve to the atmosphere and a second position at which said drain valve closes the interior of said oil separator means to the atmosphere;
a non-return valve operatively connected between said oil separator means and said air dryer means for preventing compressed air received by said air dryer means from flowing back to said oil separator means; and
a governor device operatively connected to said regenerating valve and to said drain valve for issuing a command to said regenerating valve when air pressure within said air reservoir reaches a predetermined maximum which causes said regenerating valve to move to the first position thereof thereby opening the interior of said air dryer means to the atmosphere, said governor device ceasing the issuance of said command to said regenerating valve when air pressure within said air reservoir reaches a predetermined minimum, and for issuing a command to said drain valve which causes said drain valve to move to the first position thereof.

2. An air compressor system as claimed in claim 1, wherein said governor device issues the command to move said drain valve to said first position thereof prior to issuing the command to said regenerating valve during a cycle of operation of the system.

3. An air compressor system as claimed in claim 2, wherein said regenerating valve and said drain valve each comprise a control piston that is movable when compressed air is supplied thereto, and said governor device comprises means for supplying compressed air to each said control piston to generate said commands.

4. An air compressor system as claimed in claim 3, wherein a purge tank is operatively connected in the system between said residue removing means and said non-return valve for storing compressed air after residue is removed therefrom by said residue removing means.

5. An air compressor system as claimed in claim 3, wherein said residue removing means comprises a filter body including a grid of intertwined metal wires or bands.

6. An air compressor system as claimed in claim 3, wherein said residue removing means comprises a first trap section including a plurality of plates each of which has a plurality of holes extending therethrough, and a second trap section defined in the system between said first trap section and said non-return valve, said second trap section comprising granular solid material.

7. An air compressor system as claimed in claim 3, wherein said residue removing means comprises a filter body consisting of a plurality of annular filter units mounted one upon another.

8. An air compressor system as claimed in claim 2, wherein a purge tank is operatively connected in the system between said residue removing means and said non-return valve for storing compressed air after residue is removed therefrom by said residue removing means.

9. An air compressor system as claimed in claim 2, wherein said residue removing means comprises a filter body including a grid of intertwined metal wires or bands.

10. An air compressor system as claimed in claim 2, wherein said residue removing means comprises a first trap section including a plurality of plates each of which has a plurality of holes extending therethrough, and a second trap section defined in the system between said first trap section and said non-return valve, said second trap section comprising granular solid material.

11. An air compressor system as claimed in claim 2, wherein said residue removing means comprises a filter body consisting of a plurality of annular filter units mounted one upon another.

12. An air compressor system as claimed in claim 1, wherein a purge tank is operatively connected in the system between said residue removing means and said non-return valve for storing compressed air after residue is removed therefrom by said residue removing means.

13. An air compressor system as claimed in claim 12, wherein said residue removing means comprises a filter body including a grid of intertwined metal wires or bands.

14. An air compressor system as claimed in claim 12, wherein said residue removing means comprises a first trap section including a plurality of plates each of which has a plurality of holes extending therethrough, and a second trap section defined in the system between said first trap section and said non-return valve, said second trap section comprising granular solid material.

15. An air compressor system as claimed in claim 12, wherein said residue removing means comprises a filter body consisting of a plurality of annular filter units mounted one upon another.

16. An air compressor system as claimed in claim 1, wherein said residue removing means comprises a filter body including a grid of intertwined metal wires or bands.

17. An air compressor system as claimed in claim 1, wherein said residue removing means comprises a first trap section including a plurality of plates each of which has a plurality of holes extending therethrough, and a second trap section defined in the system between said first trap section and said non-return valve, said second trap section comprising granular solid material.

18. An air compressor system as claimed in claim 1, wherein said residue removing means comprises a filter body consisting of a plurality of annular filter nits mounted one upon another.

* * * * *